Patented Mar. 7, 1950

2,499,369

UNITED STATES PATENT OFFICE 2,499,369

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,772

6 Claims. (Cl. 252—340)

This invention relates to processes or procedures particularly adapted for preventing, breaking or resolving emulsions of the water-in-oil type, particularly petroleum emulsions. This application is a continuation-in-part of our co-pending application Serial No. 8,722, filed February 16, 1948.

Complementary to the above aspect of our invention is our companion invention concerned with the new chemical products or compounds used as the demulsifying agents in said aforementioned processes or procedures, as well as the application of such new chemical compounds, products, and the like, in various other arts and industries, along with methods for manufacturing said new chemical products or compounds which are of outstanding value in demulsification. See our co-pending application Serial No. 59,771, filed November 12, 1948.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil, and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Specifically, the present process is concerned with the resolution of petroleum emulsions by means of hydrophile oxyalkylated derivatives of certain organic solvent-soluble polymerized vinyl resins or polymerized acrylic acid or substituted acrylic acid resins or resinous polymers, as hereinafter described. The preparation of such oil-soluble polymers is well known. Subsequently there is described a method of oxyalkylating such polymers, and particularly their oxyethylation.

The oxyalkylating compounds employed are alpha-beta olefine oxides having not over 4 carbon atoms and selected from the class consisting of ethylene oxide, propylene oxide, butylene oxide, glycide and methylglycide. Having obtained such oxyalkylated derivatives they are employed as demulsifiers, as hereinafter described.

The preparation of monomeric vinyl monomers, including acrylates, is well known. Broadly speaking, the vinyl monomers are characterized by having the structure

in which X is a negative radical. Examples of such monomers are styrene, beta pinene, indene coumarone, methylacrylate, methylmethacrylate, vinyl acetate, vinyl chloride, chloroprene, etc. Possibly isobutylene should be included, although this is immaterial for the present purpose. Some of the vinyl monomers contain the ester linkage; for instance, vinyl acetate, methyl acrylate, methyl methacrylate, etc. Comparable monomeric vinyl esters can be prepared, in which there is present an aliphatic radical containing at least 8 carbon atoms and not over 20 carbon atoms. Such radicals are the derivatives of higher fatty acids, being either the residue of an acyl radical, as in a higher fatty acid, which has entered into resinification, or being the comparable alcohol obtained from the higher fatty acid by conventional procedure. Such monomers containing the vinyl radical can be polymerized so as to yield organic solvent-soluble polymers having a molecular weight indicating that the polymer contains at least 3 or more units. Ordinarily, the number of units is apt to be considerably in excess of three.

The monomers are generally prepared from a low molal monomer, for example, from methyl acrylate or methyl methacrylate, on the one hand, or from vinyl acetate on the other hand. If methyl methacrylate or a comparable ester is subjected to reaction with a high boiling alcohol, for instance, one having 8 carbon atoms or more, in presence of a suitable catalyst, methyl alcohol is eliminated with the formation of the ester of the higher alcohol. This reaction is commonly referred to as alcoholysis. Similarly, if vinyl acetate is subjected to reaction with a higher fatty acid such as oleic acid, vinyl oleate can be obtained with the elimination of acetic acid. This reaction is sometimes referred to as acidolysis. Other convention procedures for producing esters may be employed. For instance, methyl acrylate and oleyl acetate may be subjected to reaction so as to eliminate methylacetate. Similarly, vinyl acetate and methyl oleate may be reacted. Such reactions may be referred to as trans-esterification. As to the preparation of such esters, reference is made to U. S. Patent No. 2,299,862, dated October 27, 1942, to Toussaint et al., and to U. S. Patent No. 2,091,627, dated August 31, 1937, to Bruson. See also The Journal of American Chemical Society, volume 69, 2439 (1947).

As previously noted, the demulsifiers employed in the present process are obtained by the oxyalkylation of certain polymerized vinyl monomers containing an ester radical. Such monomers may be indicated by the following formula

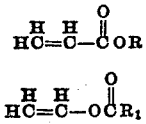

It will be noted that in both instances the monomer is an ester. In one instance the vinyl radical is attached to the carbonyl carbon atom of an ester radical; in the other instance, it is attached to the oxygen atom of an oxyacyl radical. In either instance R must contain at least 5 and not over 20 carbon atoms. Note particularly that aforementioned U. S. Patent No. 2,091,627 describes oil-soluble polymers derived from monomeric esters of acrylic acid or its alpha-alkyl or alpha-aryl substitution products, by combination with monohydric alcohols containing more than 4 carbon atoms, such as the amyl, hexyl, heptyl, octyl, nonyl, decyl, lauryl, myricyl, acetyl or octadecyl esters of acrylic acid. The esters described in said aforementioned U. S. Patent No. 2,091,627 are particularly those of the normal, primary saturated aliphatic alcohols, but also suitable are the analogous esters of the corresponding secondary or branched-chain alcohols.

As to the second class of esters, those in which the vinyl radical is present in the alcoholic part of the ester, attention in said patent is directed to the vinyl esters of heptoic acid, lauric acid, palmitic acid, stearic acid, etc.

The aforementioned article appearing in the Journal of American Chemical Society, volume 69, 2439 (1947), additionally describes the preparation of vinyl esters of higher fatty acids employing vinyl acetate and oleic acid.

Having obtained the vinylic ester monomer, as described previously, the process of polymerization consists essentially of adding approximately one-half of 1% of benzoyl peroxide to the ester and heating at 100° to 110° C. for 10 to 24 hours until one obtains a polymer which is still oil-soluble, and is sub-rubbery in the sense that it has not reached the rubbery stage. Molecular weight determination of the polymers herein described indicates that they are resins having at least 3 or more units. As a matter of fact, the number of units per resin molecule, seems to be substantially higher, several times this initial trimeric stage. Any unpolymerized monomer can be removed by vacuum distillation, but this is not necessary. The same method of polymerization can be adapted to vinyl esters of lauric acid, palmitic acid, stearic acid, oleic acid, etc. Such polymerization is described in aforementioned U. S. Patent No. 2,091,627.

Having obtained such water-insoluble oil-soluble, viscous heat-polymerized product, from an ester such as amyl, hexyl, myricyl, acetyl, nonyl, lauryl, octyl, or octadecyl ester of acrylic acid, or methacrylic acid, or the vinyl ester of lauric acid, palmitic acid, stearic acid, oleic acid, etc., the next step simply involves the oxyalkylation of such polymer.

Compounds generally subjected to oxyalkylation are characterized by reactive hydrogen atoms, i. e., hydrogen atoms attached to oxygen, nitrogen, or sulfur. Specifically, such compounds are acids, alcohols, phenols, mercaptans, ammonia, primary amines, secondary amines, amides, etc. In some instances, compounds not having a labile hydrogen atom still may be susceptible to oxyalkylation and particularly oxyethylation. This is true of compounds having ester linkages. In such instances, apparently the alkylene oxide enters as a divalent radical at the carbonyl carbon atom or at the acyl oxygen atom. We have found that the water-insoluble polymerized esters herein described are susceptible to reaction with an alkylene oxide, particularly ethylene oxide, so as the resultant products become water-dispersible or water-soluble and as such are valuable for numerous purposes, particularly demulsification. The exact reaction which takes place is not known. In a co-pending application filed by one of the present applicants, Serial No. 59,769, filed November 12, 1948, there is an analogous reaction in which an ester of an amino-alcohol, free from a labile hydrogen atom, is subjected to oxyalkylation. In examining the mechanism of the reaction, which is the same as the present one insofar that an ester group is attached by an alkylene oxide, particularly ethylene oxide, the following appears in verbatim form in the aforementioned application:

"Re-examining the last formula previously referred to, it is to be noted that such product does not contain a reactive hydrogen atom. I have found, however, that such ester of an amino-alcohol, even though water-insoluble and showing no appreciable tendency to emulsify prior to treatment with an alkylene oxide, can be treated with an alkylene oxide, particularly ethylene oxide, so as to obtain a water-soluble product which seems to be a mixture, and the exact nature of which is not known at the moment. Presumably, in part, the product would appear to be the resultant of a reaction, where the ethylene oxide enters at the carbonyl carbon position in a manner indicated in the following way:

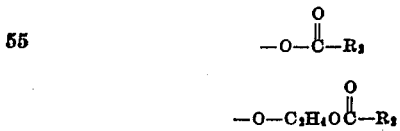

There would be no difference, of course, if the ethylene oxide were considered as entering between the radical $R_1$ and the adjacent oxygen atom. This is shown in the following:

"Actually, it is believed that the reaction which takes place is somewhat more complex than the simpler suggestions previously presented. For instance, there my be a rupture involving one fragment at the carbonyl carbon atom and another fragment at the adjoining oxygen atom. This is shown in the following manner:

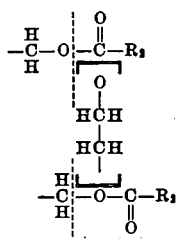

One valency bond is severed, as indicated by broken line, and replaced by valency bond connected with the divalent ethoxy radical. Obviously, it is not intended to show any abnormal valency for carbon.

"Assuming that part of the reaction or reactions, may be explained by a rupture, as above indicated, it is a matter of further speculation as to what happens to the two amino-alcohol residues, as differentiated from the acyl and acyloxy residues. The two might simply unite, as indicated in the following manner:

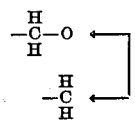

or it might be possible, of course, that another mole of ethylene oxide furnishes a connective divalent radical, as indicated in the following:

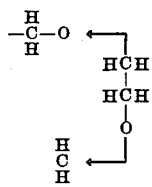

"The fact that the resultant obtained from a single ester does not always yield products which are uniform, and also the fact that comparable materials prepared by increased oxyethylation of the secondary amine, prior to esterification, act somewhat differently, both as emulsifiers for oil-in-water emulsions and as demulsifiers for water-in-oil emulsions, indicate that even though I do not know the composition completely, it probably represents, at least in part, other reaction products in addition to those which have been indicated briefly."

Previous reference has been made to the higher fatty acids, and particularly the saturated higher fatty acids. The higher fatty acids include caprylic acid, capric acid, lauric acid, myristic acid, palmitic acid, stearic acid, as well as hydroxystearic acid, dihydroxystearic acid, trihydroxystearic acid, etc., as well as the unsaturated higher fatty acids, such as oleic acid, linoleic acid, linolenic acid, ricinoleic acid, etc.

There may be an anomaly in the fact that reference has been made to the absence of reactive hydrogen atoms in the ester which is subjected to oxyalkylation, and at the same time, esters of ricinoleic acid, hydroxystearic acid, and the like, have been included. Ethylene oxide reacts with primary alcohols. Apparently, however, under ordinary conditions of reaction, or even under the more drastic conditions of reaction herein described, ethylene oxide or the other alkylene oxides, do not react with the secondary alcoholic radical which is part of an acyl radical, as in the case of ricinoleic acid, hydroxystearic acid, etc. In fact, if ricinoleic acid or ethyl ricinoleate is subjected to oxyalkylation, particularly oxyethylation, one does not obtain a compound in which the alcoholic hydroxyl of the recinoleyl radical has been attacked.

The same applies in connection with the compounds herein described, if one happens to employ an ester in which the ricinoleyl or similar group is present. If the final product is subjected to saponification and then acidified and extracted so as to recover the fatty acid as such, examination of the fatty acid reveals that it is the unaltered original fatty acid and not the fatty acid of the following type:

$$H(OR_1)_nOR_3COOH$$

wherein $R_1O$ represents a divalent alkylene oxide radical and $HOR_3COOH$ represents ricinoleic acid, hydroxystearic acid, or the like.

*Example 1ª*

| | Grams |
|---|---|
| Lauryl methacrylate | 250 |
| Xylene | 100 |
| Benzoyl peroxide | 1.25 |

The lauryl methacrylate was mixed with the xylene and shaken with 250 c. c. of a 1% solution of caustic soda to remove the inhibitor. This was followed by three shakes with 100 c. c. each of distilled water to remove the caustic. The product was then filtered through dry filter paper to remove any trace of moisture still suspended. 2.5 grams of benzoyl peroxide were then added as a polymerization catalyst. The mixture was refluxed for 14 hours. During this period of time the product became more viscous and the increase in viscosity was particularly noticeable when cold. At the end of the polymerization period the xylene solution had a viscosity comparable to or in excess of castor oil, i. e., between that of castor oil and blown castor oil. The final product obtained had slightly less than 30% of xylene. This solution was then tested for the presence of benzoyl peroxide before subjecting to oxyalkylation. In no instance was benzoyl peroxide found to be present, provided that refluxing had continued for at least 6 to 8 hours, and preferably, over 10 hours. If in any similar experiment benzoyl peroxide is present, it should be eliminated by the usual conventional procedures before the oxyalkylation step.

*Example 2ª*

The same procedure was followed as in Example 1ª, except that decylmethacrylate was employed. The time required for polymerization was 16 hours.

*Example 3ª*

The same procedure was followed as in the two preceding examples, except that myricyl methacrylate was employed. The time required was somewhat longer for polymerization, i. e., about 18 hours.

*Example 4ª*

The same procedure was followed as in the preceding examples, except that cetyl methacrylate was employed, and the time required for polymerization was about 18 hours.

*Example 5ª*

The same procedure was followed as in Example 1ª, except that octadecyl methacrylate was employed and the time required for polymerization was 20 hours.

*Example 6ª*

The same procedure was followed as in Example

1ª, except that laurylacrylate was used, and the time required for polymerization was 14 hours.

*Example 7ª*

The same procedure was followed as in Example 1ª, except that cetylacrylate was used and the time required for polymerization was 16 hours.

*Example 8ª*

The same procedure was followed as in Example 1ª, except that octadecyl acrylate was used, and the time required for polymerization was 19 hours.

*Example 9ª*

The same procedure was followed as in Example 1ª, except that vinyl laurate was used, and the time required for polymerization was 22 hours.

*Example 10ª*

The same procedure was followed as in Example 1ª, except that vinylstearate was used, and the time required for polymerization was 18 hours.

*Example 11ª*

The same procedure was followed as in Example 1ª, except that vinyl palmitate was used, and the time required for polymerization was 21 hours.

*Example 12ª*

The same procedure was followed as in Example 1ª, except that oleylacrylate was used, and the time required for polymerization was 12 hours.

*Example 13ª*

The same procedure was followed as in Example 1ª, except that oleyl methacrylate was used, and the time required for polymerization was 15 hours.

It is to be noted that the above conditions of polymerization may vary considerably, even with the same monomeric compound. It may sometimes happen that the use of caustic does not remove all the inhibitor. Sometimes the period of incubation prior to polymerization seems to vary with the particular sample of benzoyl peroxide used. The main point to bear in mind in the polymerization process, is that the objective is to obtain a solvent-soluble, particularly xylene-soluble, polymer, which will exhibit a viscosity, when mixed with one-half or one-third its weight of xylene, of approximately castor oil or somewhat in excess thereof, i. e., approximately the viscosity of blown castor oil. In some instances, certain samples may show this viscosity in a major fraction of the time above indicated. In other words, the time required may be one-half to one-third the period of time indicated. At other times it may require somewhat longer, i. e., one-fifth to one-third longer. If increased length of time does not produce the appropriate state of polymerization, then the experiment should be repeated, using a slightly increased amount of benzoyl peroxide up to ¾ of 1%, or thereabouts, or using a higher temperature of polymerization, such as substituting cymene for xylene. Similarly, if the polymerization goes too far, the time of polymerization should be cut down or less peroxide used, or a lower temperature employed, for instance, using toluene instead of xylene. The appearance of these products was not only similar to castor oil or blown castor oil in viscosity, but it was also similar in color, i. e., yellow or yellowish-amber in color.

Such experimentation demands nothing more than routine variation. It is to be noted that the final stage of polymerization is not critical. All that is required is that the product be water-insoluble, and its solution in an aromatic solvent within the ratios indicated above be within the range specified, and finally, that the product be susceptible to oxyalkylation, without becoming insoluble or rubbery. This latter property is best determined upon a particular sample by an actual oxyalkylation procedure on a pilot plant scale.

*Example 1ᵇ*

The xylene solution of polymerized lauryl methacrylate described under the heading of Example 1ª, containing slightly less than 30% xylene, was employed. The amount used was 325 grams. 4 grams of sodium methylate were added to the solution and placed in a stirring autoclave and 400 grams of ethylene oxide introduced in four portions of 100 grams each. Initially, 100 grams of ethylene oxide were added and the product stirred for six hours at 160° C. The maximum gauge pressure was 150 pounds. At the end of this reaction period, the pressure dropped to merely that of xylene. At the end of the initial reaction period, the product was as viscous as before, but showed a definite tendency to emulsify in water. The second addition of ethylene oxide was then made and the same temperature was employed; the time required for reaction was five hours, and the maximum gauge pressure was 180 pounds. At this point, two more grams of sodium methylate were added in order to set up the reaction. At the end of this second period, the product was still a viscous liquid and was water-emulsifiable. A third addition of ethylene oxide was then made. This addition required 6½ hours at a maximum temperature of 165° C. The maximum pressure was 170 pounds per square inch gauge pressure. At the end of this period, the product was still viscous and produced a milky emulsion, on shaking with distilled water. The final addition of ethylene oxide was made in six hours, employing a maximum temperature of 150° C. and a pressure of 165 pounds per square inch. The color of the product darkened during this last period and the viscosity remained about the same. There was some tendency to show stringiness or lumpiness. The final product was completely emulsifiable in water and produced an excellent but turbid emulsion.

*Example 2b*

The same procedure was followed as in Example 1ᵇ, except that the polymerized resin solution employed was that described under the heading of Example 4, preceding. The conditions of oxyethylation were substantially the same, i. e., four additions of 100 grams each of ethylene oxide, using a temperature of 150° to 165° C. In each instance the time required varied from 5 to 6½ hours for each addition. The maximum gauge pressure varied from 150 pounds to 185 pounds and the amount of catalyst employed was 2¼%, based on the weight of the resin, excluding the xylene.

*Example 3ᵇ*

The same procedure was followed, using the product of Example 5ª, preceding. The conditions of oxyethylation were substantially the same, that is, four additions of 100 grams each of ethylene oxide, using a temperature of 150° to 165° C. In each instance, the time required varied from 5 to 6½ hours for each addition. The maximum gauge pressure varied from 150 pounds to 185 pounds, and the amount of catalyst employed was 2¼%, based on the weight of the resin excluding the xylene.

The equivalent amount of any alkylene oxide, as previously pointed out, can be substituted for ethylene oxide. Propylene oxide, for example, gives decidedly less solubility based on equal molar equivalents, then ethylene oxide. Glycide and methylglycide are entirely satisfactory and impart a definite hydrophile property comparable to ethylene oxide, based on equal molal ratios. However, the use of glycide is extremely hazardous and it is our preference to use either ethylene oxide or a combination of ethylene oxide, or propylene oxide. We know of no instance where the compounds obtained from these particular resins and using any other oxide, other than ethylene oxide, are any better or more economical. In other words, of all the alkylene oxides noted, it is our definite preference to use ethylene oxide, due to lower cost, and speed of reaction. Propylene oxide, for example, is much less reactive and generally requires greater time for oxyalkylation.

In some instances, the products starting with soluble resins yield insoluble products which do not show marked surface-activity. In such instances, if insolubilization or rubberiness takes place during oxyalkylation, it is desirable to repeat the experiment, using a less highly polymerized initial resin.

Conventional demulsifying agents employed in the treatment of oil field emulsions are used as such, or after dilution with any suitable solvent, such as water, petroleum hydrocarbon, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octvl alcohol, etc., may be employed as diluents. Miscellaneous solvents, such as pine oil, carbon tetrachloride, sulfur dioxide extract obtained in the refining of petroleum, etc., may be employed as diluents. Similarly the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant, because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or subsurface- or surface-active. Such resins, in turn, are oxyalkylation-susceptible, water - insoluble, organic solvent-soluble and fusible.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances, additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons, for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances, the oxalkylated products herein specified as demulsifiers can be conveniently used without dilution. However, as previously noted, they may be diluted as desired with any suitable solvent. For instance, by mixing 75 parts, by weight, of an oxyalkylated derivative, for example, the product of Example 1b, with 15 parts, by weight, of xylene and 10 parts, by weight, of isopropyl alcohol, an excellent demulsifier is obtained. Selection of the solvent will vary, depending upon the solubility characteristics of the oxyalkylated product, and of course, will be dictated, in part, by economic considerations, i. e., cost.

As noted above, the products herein described may be used not only in diluted form, but also may be used admixed with some other chemical demulsifier. A mixture involving the use of more than one demulsifier and including, of course, the demulsifier herein described, is illustrated by the following:

Oxyalkylated derivative, for example, the product of Example 1b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Previous attention has been directed to the fact that the polymerization required is trimeric, or being in all likelihood considerably higher than the trimeric state, as indicated by even an approximated molecular weight determination and the enormous increase in viscosity over the monomer. Such limitation is incorporated into the claims. Furthermore, in the claims the product is not only designated as being hydrophile, but at least hydrophile to the extent that the product will mix with several times its volume of distilled water at ordinary temperature, for instance, 2 to 10 times the volume of distilled water to give a milky suspension. This test can be made with the aromatic solvent present, as indicated. Our experience has been where these products are soluble in aromatic solvents, they are also soluble in other organic solvents, such as petroleum fractions, chlorinated hydrocarbons, mixtures incorporating ether alcohols, etc.

Having thus described our invention, what we claim as new and desire to secure by Letters Patent is:

1. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, resinous polymer, obtained by the polmerization of a monomer selected from the class consisting of compounds of the following structure

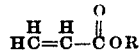

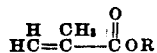

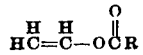

in which R is an aliphatic radical having at least 5 and not over 20 carbon atoms; said state of polymerization being at least trimeric and said hydrophile properties being at least sufficient to produce a milky suspension when shaken with several volumes of distilled water.

2. The process of claim 1, wherein R is a saturated aliphatic radical.

3. A process for breaking petroleum emulsions of the water-in-oil type, characterized by subjecting the emulsion to the action of a demulsifier including hydrophile synthetic products, said hydrophile synthetic products being oxyethylation products of ethylene oxide and an oxyethylation-susceptible, fusible, organic solvent-soluble, water-insoluble, resin obtained by the polymerization of a polymer selected from the class consisting of compounds of the following structure:

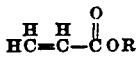

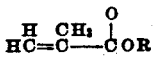

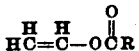

in which R is a saturated aliphatic radical having at least 5 and not over 20 carbon atoms; said state of polymerization being at least trimeric and said hydrophile properties being at least sufficient to produce a milky suspension when shaken with several volumes of distilled water.

4. The process of claim 3, wherein the selected monomer has the following structure:

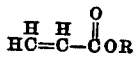

5. The process of claim 3, wherein the selected monomer has the following structure:

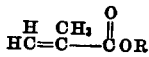

6. The process of claim 3, wherein the selected monomer has the following structure:

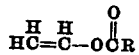

MELVIN DE GROOTE.
BERNHARD KEISER.

REFERENCES CITED

The following references are of record in the file of this patent:

UNITED STATES PATENTS

| Number | Name | Date |
|---|---|---|
| 2,307,058 | Moeller | Jan. 5, 1943 |
| 2,454,545 | Bock et al. | Nov. 23, 1948 |